United States Patent
Batcheller et al.

(10) Patent No.: US 10,941,001 B2
(45) Date of Patent: Mar. 9, 2021

(54) GRAIN STORAGE AND PROCESSING FACILITY HAVING AN OPTICAL SENSING SYSTEM

(71) Applicant: Intelligent Agricultural Solutions LLC, Fargo, ND (US)

(72) Inventors: David Batcheller, Fargo, ND (US); Joshua Gelinske, Fargo, ND (US); Garrett Mauer, Moorhead, MN (US); Roger Price, Fargo, ND (US); Adam Weiss, Fargo, ND (US); Jaden C. Young, Fargo, ND (US); Jesse Scott Trana, Fargo, ND (US)

(73) Assignee: INTELLIGENT AGRICULTURAL SOLUTIONS, LLC, Fargo, ND (US)

( * ) Notice: Subject to any disclaimer, the term of this patent is extended or adjusted under 35 U.S.C. 154(b) by 0 days.

(21) Appl. No.: 16/637,649

(22) PCT Filed: Aug. 8, 2018

(86) PCT No.: PCT/US2018/045796
§ 371 (c)(1),
(2) Date: Feb. 7, 2020

(87) PCT Pub. No.: WO2019/032693
PCT Pub. Date: Feb. 14, 2019

(65) Prior Publication Data
US 2020/0270064 A1 Aug. 27, 2020

Related U.S. Application Data

(60) Provisional application No. 62/543,187, filed on Aug. 9, 2017.

(51) Int. Cl.
*B65G 3/04* (2006.01)
*A01F 25/20* (2006.01)
*B65G 65/30* (2006.01)

(52) U.S. Cl.
CPC ............... *B65G 3/04* (2013.01); *A01F 25/20* (2013.01); *B65G 65/30* (2013.01)

(58) Field of Classification Search
CPC .......... B65G 65/30; B65G 3/04; B07C 5/342; A01D 41/1277; A01D 41/1272; A01D 41/127; A01F 25/20
(Continued)

(56) References Cited

U.S. PATENT DOCUMENTS 4,369,870 A * 1/1983 Taylor .................... B65G 47/72
193/23
4,623,056 A * 11/1986 Flaugher ................... B29B 7/60
193/23
(Continued)

FOREIGN PATENT DOCUMENTS

EP 2826356 A1 1/2015

OTHER PUBLICATIONS

International Preliminary Report of Patentability from PCT Application Serial No. PCT/US2018/045796, dated Feb. 20, 2020, 10 pages.

*Primary Examiner* — James R Bidwell

(57) ABSTRACT

A grain facility has a grain receiving station and a grain transport line with a grain elevator, a distributor with at least one input spout, and at least one grain bin. The grain transport line moves grain from the grain receiving station to one of the at least one grain bins and the distributor directs the grain to a selected bin of the at least one grain bin. The grain facility further includes an optical sensing system having at least one optical sensor positioned in the grain transport line at or before the distributor, wherein the optical sensing system senses the type of grain in the grain transport line. A control system determines if the grain passing through the grain transport line is suitable for the selected (Continued)

grain bin and produces an alarm if the grain in the grain transport line is not suitable for the selected grain bin.

11 Claims, 6 Drawing Sheets

(58) Field of Classification Search
USPC .......................... 348/148; 414/298; 198/524
See application file for complete search history.

(56) References Cited

U.S. PATENT DOCUMENTS

| | | | | |
|---|---|---|---|---|
| 5,957,773 | A * | 9/1999 | Olmsted | A01D 41/1208 |
| | | | | 460/149 |
| 6,845,326 | B1 * | 1/2005 | Panigrahi | G01J 3/02 |
| | | | | 250/339.02 |
| 2015/0009328 | A1 * | 1/2015 | Escher | A01D 41/1277 |
| | | | | 348/148 |
| 2018/0161767 | A1 * | 6/2018 | Gauthier | B07C 5/366 |

* cited by examiner

GRAIN STORAGE AND PROCESSING FACILITY HAVING AN OPTICAL SENSING SYSTEM

CROSS REFERENCE TO RELATED APPLICATION

This application claims the benefit of U.S. Provisional Application No. 62/543,187 filed Aug. 9, 2017, which is hereby incorporated by reference in its entirety.

BACKGROUND OF THE INVENTION

Field of Invention

This invention relates generally to grain storage and processing facilities, and more particularly to an optical sensing system with the grain facility used for verification of grain type for prevention of misrouting and mixing different types of grain in a grain bin of the grain facility.

Description of Related Art

A problem in the current agricultural market is related to the risk of mistakenly loading two different types of grain into a singular grain bin by means of the grain elevator leg. Typically, there is an operator in the control room of a grain storage and processing facility who is supervising the product and controlling the flow of product either manually or through a computer terminal, or otherwise selecting the grain bin that will accept the commodity being unloaded by the truck driver into the grain pit. An issue arises when the individual accidentally selects a grain bin that contains a grain different from the grain the truck has unloaded into the grain pit. When this happens, it is almost impossible to separate the grains into separate bins, thus this can result in a huge loss of profit for the operator.

Prior art discloses optical systems that have a primary focus on identifying grain parameters within a harvesting machine. For example, some devices focus on the measurement of the grain, sensing certain grain attributes, such as identifying grain versus material other than grain, or measuring grain constituents while the grain is moving through the processing elements and conveyor systems inside of the harvester. Prior art also covers optical machine vision systems and near-infrared spectroscopy for sensing bulk material parameters in transfer, and related software for training and identifying grain types. Some analytical procedures used at elevator facilities require the manual retrieval of a grain sample and its placement into a desktop analytical device for batch processing.

Heretofore there has not been available a system or method for detecting different types of grain so that the device can ensure no mixing up between grain bins with the advantages and features of the present invention. For instance, a grain elevator operator may accidentally create a grain mixture by triggering corn to be dropped into a wheat bin, thus creating an undesirable, and in some cases even unusable, mixture. When this happens, the grain elevator operator is forced to either accept the degradation of their product's value, or pay large amounts of money to have the problem corrected.

OVERVIEW OF THE INVENTION

In one embodiment, the invention is directed to a grain storage and processing facility having a grain transport line comprising a grain pit, a grain elevator, a distributor with at least one input spout, and at least one grain bin. The grain transport line moves grain from the grain pit to one of the at least one grain bins and the distributor directs the grain to a selected bin of the at least one grain bin. The grain storage and processing facility further includes an optical sensing system having at least one optical sensor positioned in the grain transport line at or before the distributor, wherein the optical sensing system senses the type of grain in the grain transport line. A control system determines if the grain passing through the grain transport line is suitable for the selected grain bin and produces an alarm if the grain in the grain transport line is not suitable for the selected grain bin.

In one embodiment, the invention is directed to an optical sensing system that is capable of a variety of functionalities that include identifying the type of commodity, discriminating one type of commodity from another type of commodity, sensing contaminants, and sensing any foreign material (FM) that mistakenly enters a grain elevator. One specific use space for this sensor, in this embodiment, is to determine the type of commodity being loaded into a grain elevator. It uses an optical sensor system to evaluate the size, shape, texture, structure, and/or color of the commodity being loaded and uses the physical attributes of the commodity to identify it or distinguish it from other commodities (for example: corn vs soybeans vs wheat vs canola vs sunflower seeds).

In aspect of the invention the optical sensing system optoelectronically senses the grain that is being unloaded into the grain pit with an optical sensor which is mounted in the grain pit or near a first conveyor system functionally associated with the grain pit, to be operatively in contact with the grain. In the optical sensing system, the optical sensors communicate with the microcomputer, where software algorithms are used to evaluate particular characteristics, singularly or in combination, of the grain being unloaded. Said characteristics are compared with respective characteristics of known grains to identify the unloaded grain and to determine if it is similar to the grain residing in the grain bin into which the unloaded grain will be transferred by means of the elevator leg and/or the distributor. The control system controls the movement and the direction of the grain flow towards the targeted grain bin.

As the grain is being deposited in the grain pit, one or more sensors evaluate the grain as it passes by the window of the sensor, and sends out a message via the sensor's communication interface. The message is interpreted by the control system of the grain elevator; one example of the control system is a programmable logic controller (PLC) based system. The data output from the sensors identifies the type of grain, and the control system uses that output to warn the operator of a likely difference between the contents of the bin and the grain in transport, or to stop conveyors and to allow the operator to change the distributor position, or otherwise react to avert the potential problem.

In an alternative embodiment, the optical sensing system can be used in the identification of non-grain items or constituents. In another situation, the optical sensing system can be used in the identification of a contaminant entering the grain elevator leg, such as treated seeds that are colored with dyes.

These and other features and advantages of this invention are described in, or are apparent from, the following detailed description of various exemplary embodiments of the systems and methods according to this invention.

BRIEF DESCRIPTION OF THE DRAWINGS

The above mentioned and other features of this invention will become more apparent and the invention itself will be better understood by reference to the following description of embodiments of the invention taken in conjunction with the accompanying drawings, wherein.

Corresponding reference characters indicate corresponding parts throughout the views of the drawings.

DETAILED DESCRIPTION OF EXEMPLARY EMBODIMENTS

The invention will now be described in the following detailed description with reference to the drawings, wherein preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description.

Figure 1:
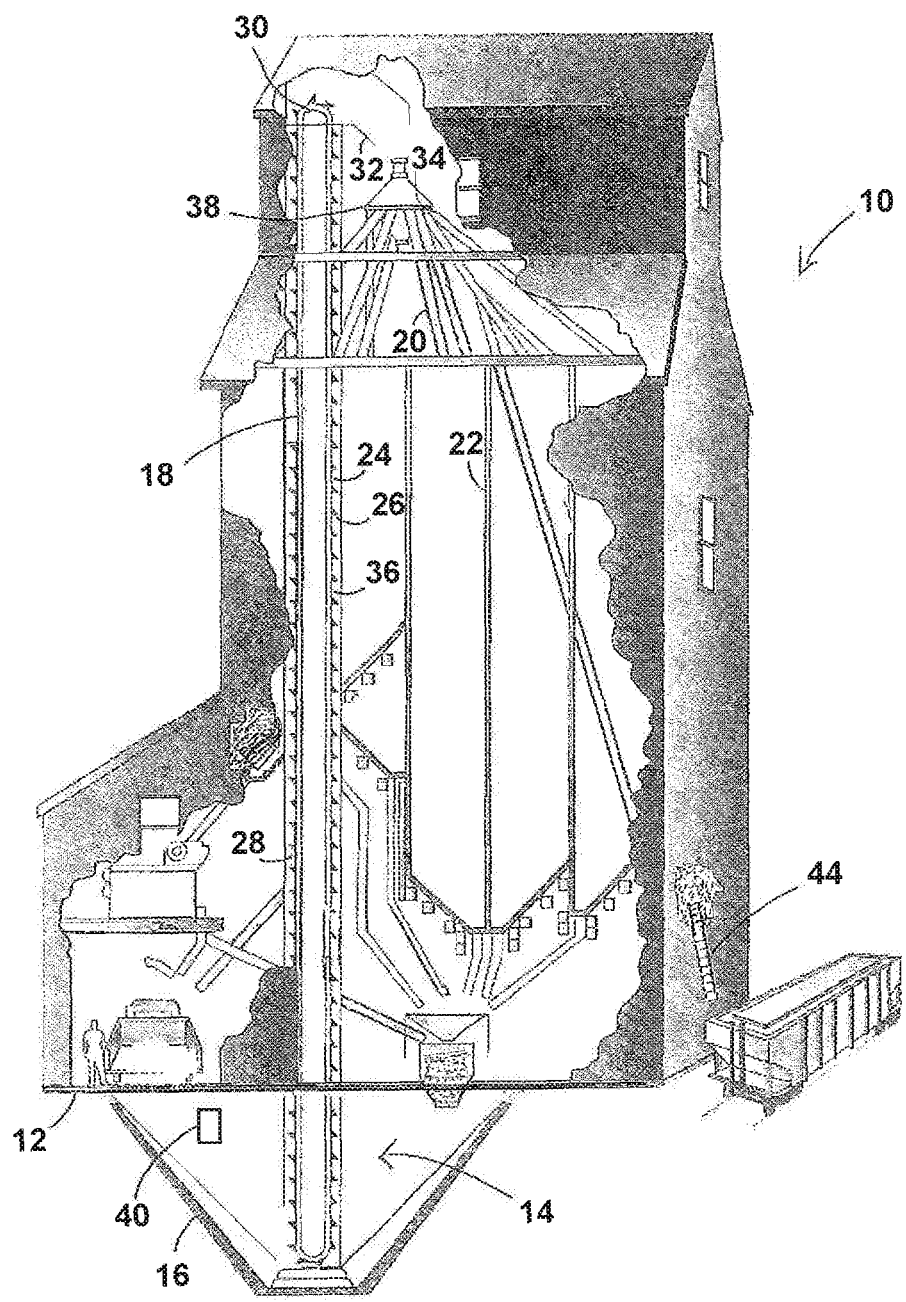
FIG. 1 is a high level image showing an example of a grain storage and processing facility having an optical sensing system according to the invention.

FIG. 1 shows a grain storage and processing facility 10 configured to stockpile and store grain. As is known in the art, the grain storage and processing facility 10 has a grain receiving station 12 such as a grain pit 16 that delivers grain to a grain transport line 14 comprising for example a grain elevator 18, and at least one input spout 20 leading to at least one grain bin 22. One will understand that the at least one grain bin 22 may be any tank, silo or other structure, either freestanding or relying on common architecture, used to store grain.

In the illustrated embodiment, when a transport vehicle enters the grain receiving station 12, the transport vehicle unloads grain onto the grain pit 16. As the grain is piled onto the grain pit 16, the grain may drain onto a horizontal conveyance belt or a drag conveyor (not shown) that conveys the grain into a loading area of the grain elevator 18. In one embodiment, the grain elevator 18 conveys the grain in a direction having a vertical component so as to change the elevation of the grain so that gravity may be used to move the grain. For example, the grain elevator 18 may comprise a bucket conveyor having a plurality of buckets, a pneumatic conveyor, or other known configuration to move grain from the grain pit 16 to the at least one grain bin 22. The illustrated embodiment shows a bucket conveyor 24 in which loaded buckets 26 move up an upward leg 28 and around a head pulley 30 a top end of the upward leg 28 where centrifugal force throws the grain out of the buckets 26 and into a throat 32 of a distributor 34. After discharge, the unloaded buckets 26 move downward along a down leg 36 of the grain elevator 18.

The distributor 34 directs the grain to a specified input spout 20. Each input spout 20 has a control valve 38 that selectively permits grain to pass through the input spout 20 to its associated grain bin 22. During a distribution stage, it is important that a switchboard operator unload the grain into a proper grain bin 22 suitable for the type of grain that is being delivered to the grain storage and processing facility 10. This requires the operator to ensure the control valve 38 for each of the input spouts 20 is properly positioned to ensure the grain is directed to the suitable grain bin 22 and to prevent any undesired mixing of grain types or other contamination in non-suitable grain bins 22.

According to the invention, the grain storage and processing facility 10 has an optical sensing system 40 comprising at least one optical sensor 42 positioned in the grain transport line 14 at or before the distributor 34. As grain moves along the grain transport line 14 and passes the optical sensor 42, the optical sensing system 40 senses the type of grain before it is distributed to a specific grain bin 22 in order to verify that the grain passing through the grain transport line 14 is suitable for the selected grain bin 22. In one embodiment, the optical sensing system 40 is placed at the grain pit 16, where the grain is initially dumped from a transport vehicle at the lower end of the grain elevator 18. In some grain elevator facilities 10, a conveyor system is placed between a dumping area and the grain pit 16. Here, the optical sensing system 40 can be placed along the conveyor system, operably in contact with the conveyed grain. Alternately or additionally, the optical sensing system 40 may is placed at an output end of the grain storage and processing facility 10 where the grain exits the grain storage and processing facility 10, such as at a spout 44 to an outbound transport vehicle such as a train car or barge.

Figure 2A:
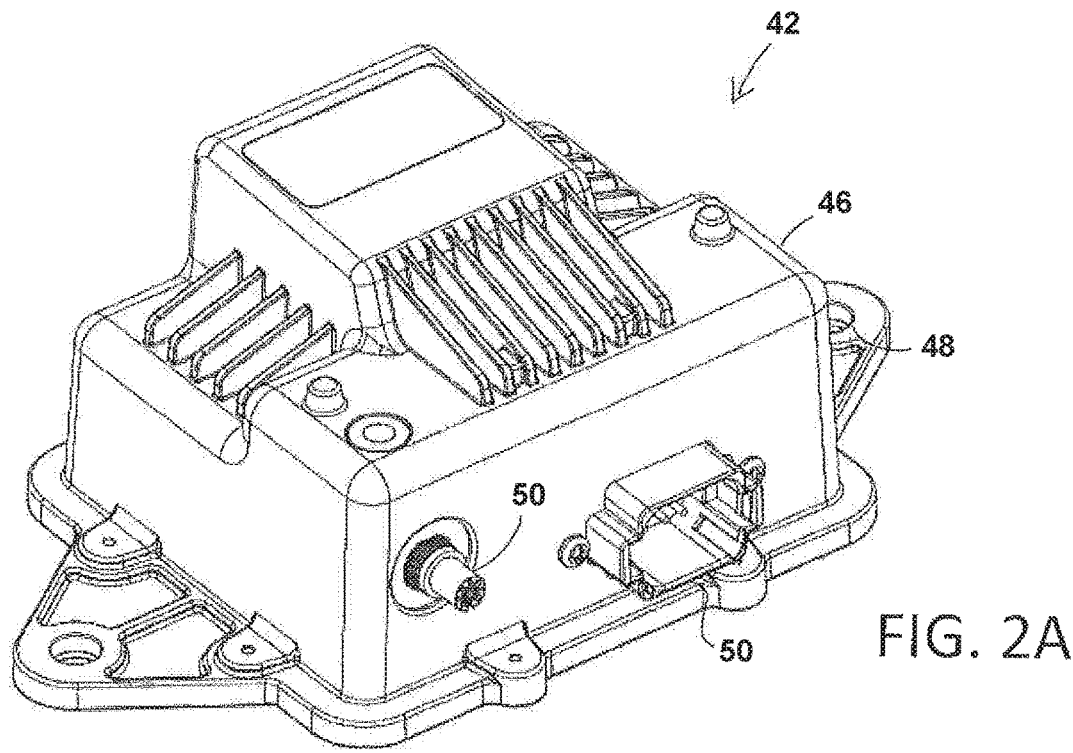
FIG. 2A is an isometric view of an optical sensor of the optical sensing system of FIG. 1.
Figure 2B:
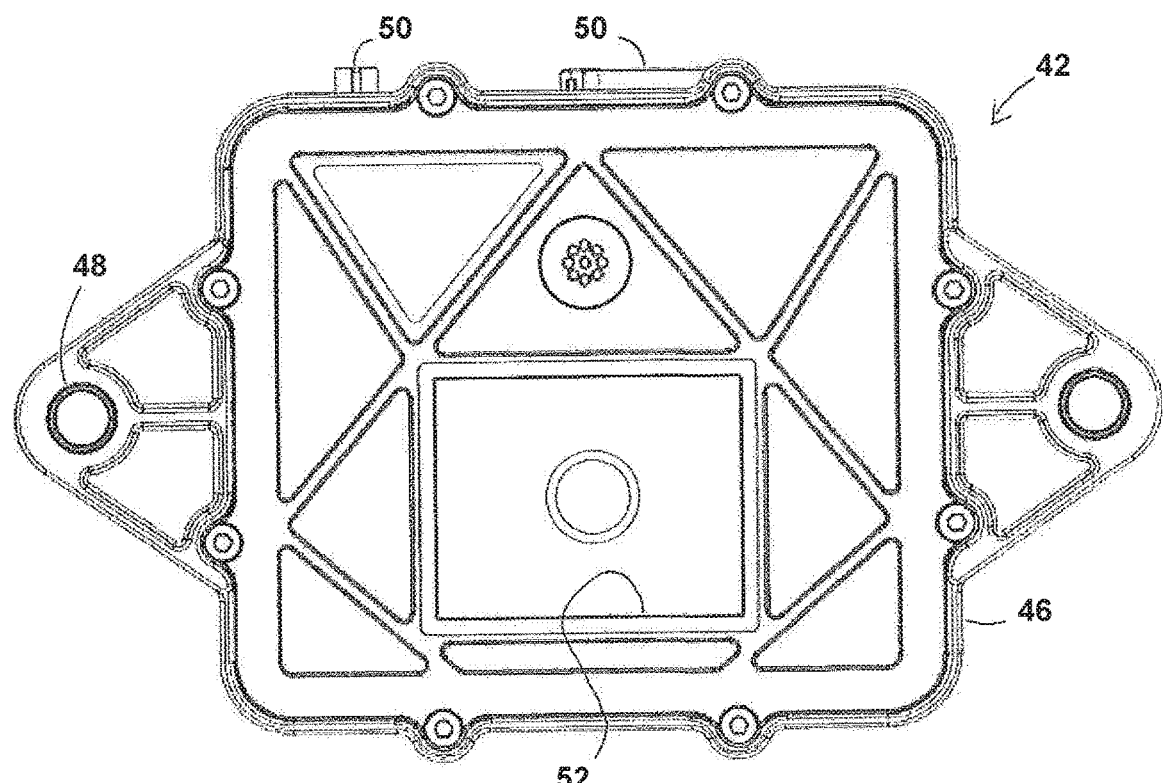
FIG. 2B is a bottom up view of the optical sensor of FIG. 2A.

FIG. 2A is an isometric view of one embodiment of the optical sensor 42 of the optical sensing system 40. The optical sensor 42 desirably has a protective outer casing 46 along with a plurality of mounting holes 48 that are used to secure the optical sensor 42 to a fixed point in the grain storage and processing facility 10. The casing 46 has suitable power and signal connectors 50 for the optical sensing system's communication purposes. FIG. 2B is a bottom-up view of the optical sensor 42 showing a transparent window 52 that is operatively in contact with the grain to be identified in the grain transport line 14. The transparent window 52 is preferably made of, but not limited to, sapphire aluminum oxynitride or magnesium aluminate. Sapphire, aluminum oxynitride and magnesium aluminate provide a broad transmission range from UV to mid-infrared wavelengths and offer the hardness, durability, and scratch-resistance required for a long term operation of the optical sensing system 40 in harsh conditions encountered in grain elevator 18 facilities.

Figure 3:
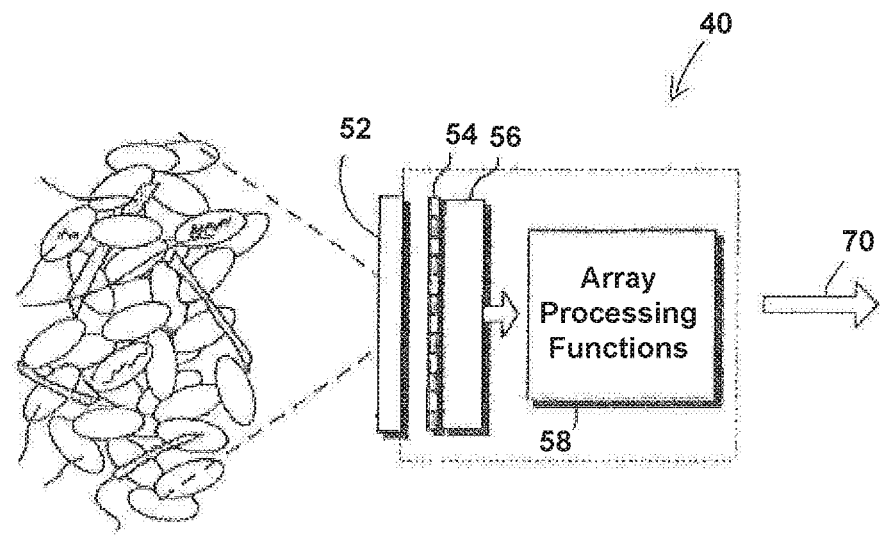
FIG. 3 is a schematic view of the optical sensing system.

FIG. 3 is one embodiment of an optical sensing system 40 in which a grain sample is illuminated with at least one light source 54, e.g., a white LED, but may use multiple LEDs at discrete wavelengths or broadband light sources to enhance color contrast. The optical sensing system 40 also includes the window 52, a lens 56, and an image sensor 58. The optical sensing system 40 and optical sensor 42 used to image the grain can be such as disclosed in commonly assigned U.S. patent application Ser. No. 15/497,097. As is known in the art, the optical sensing system 40 contains a power filtration subsystem, a photonic subsystem, a processing subsystem and a communication subsystem. As suitable optical sensing systems 40 are known in the art, further detail of the optical sensing system 40 need not be provided herein.

Figure 4:
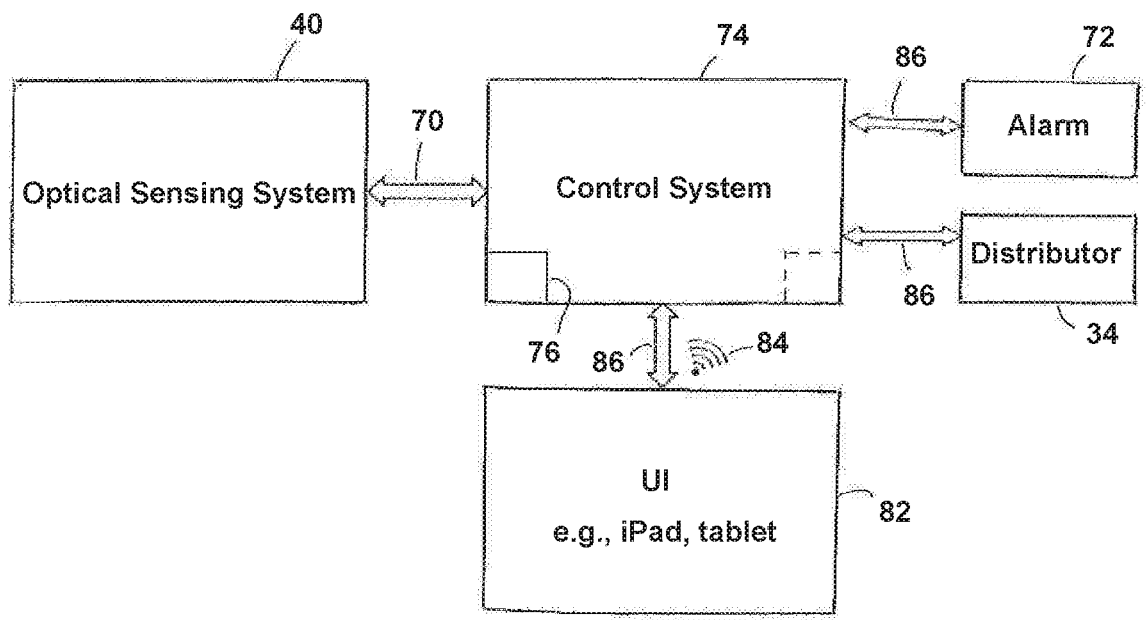
FIG. 4 is a block diagram of the elevator control system and user interface.

FIG. 4 is a block diagram that shows how the optical sensing system 40 relates to, and augments, a control system 74 of the grain storage and processing facility 10. As the grain passes the transport window 52, the optical sensing system 40 sends out signals via a communication interface 70, which may be a control system-based network, to the control system 74. The control system 74 stores the type of grain in each of the at least one grain bins 22 and compares the type of grain detected in the grain transport line 14 with the type of grain in the at least one grain bin 22 that has been selected to receive the grain. The control system 74 may send a signal such as an audible or visual alarm 72 to notify the operator if there are any differences between the contents of the selected grain bin 22 and the grain in transit in the grain transport line 14. If a discrepancy is detected between the contents of the selected grain bin 22 and the grain in transit in the grain transport line 14, the control system 74 may automatically stop the grain elevator 18, allowing the operator to change which input spout 20 the grain is distributed through by the distributor 34.

One having ordinary skill in the art should appreciate in the context of the present disclosure that the example control system 74 is merely illustrative, and that some embodiments of control systems may comprise fewer or additional components, and/or some of the functionality associated with the various components depicted in FIG. 4 may be combined, or further distributed among additional components, in some embodiments. For instance, in one embodiment, the control system 74 is distributed among the grain storage and processing facility 10. In some embodiments, the control system 74 is hosted entirely by the grain storage and processing facility 10. In some embodiments, the control system 74 is distributed among the grain storage and processing facility 10 and a remote computing device (e.g., in communication with components of the control system 74 via telemetry or radio frequency communications), and in some embodiments, the control system 74 is distributed among the towing vehicle, the implement, and a remote computing device. For purposes of brevity, attention is focused on an embodiment where the control system 74 is distributed among the grain storage and processing facility 10, with the understanding that other configurations may be used in some embodiments with similar applicability.

The control system 74 comprises one or more controllers, including controller 76 (an optional controller is shown with a dashed box, with emphasis below on the use of a single controller for sake of brevity). The control system 74 receives signals from the optical sensing system 40 and controls the actuators for the control valves 38 for each of the spouts 20. The user interfaces 82, and a communications interface 84, are all coupled over a network 86, such as a controller area network (CAN), though not limited to a CAN network or a single network. In one embodiment, the network 86 may comprise a wired network (e.g., twisted pair, copper, etc.), a wireless network (e.g., based on IEEE 802.11, Bluetooth, Near Field Communications (NFC), etc.), or a combination of a wired and wireless network. The controller 76 is explained further below in association with FIG. 6. In one embodiment, the optical sensor 42 is configured to sense the type of grain and communicate the sensed type of grain to the controller 76 (e.g., via the network 86). The actuators for the control valve 38 in the distributor 34 may be electrical or electromagnetic actuators (or in some embodiments, based on another medium, such as air), and are configured to adjust a spool (or poppet) of the corresponding control valve 38 of the spout 20 to enable grain to flow into a specified bin (e.g., bin, FIG. 1).

The user interfaces 82 may include a tablet, keyboard/pad and/or mouse, a display device (e.g., tough-type display, liquid crystal diode (LCD), plasma-based, etc.), and/or other input and output devices (e.g., a microphone for audible input, a speaker for audible output, in some embodiments). The user interfaces 82 may enable an operator to monitor the transfer of the grain. The communications interface 84 comprises suitable hardware and/or software to enable wireless communications with the control system 74, and may include a radio frequency modem and/or cellular modem.

Figure 5:
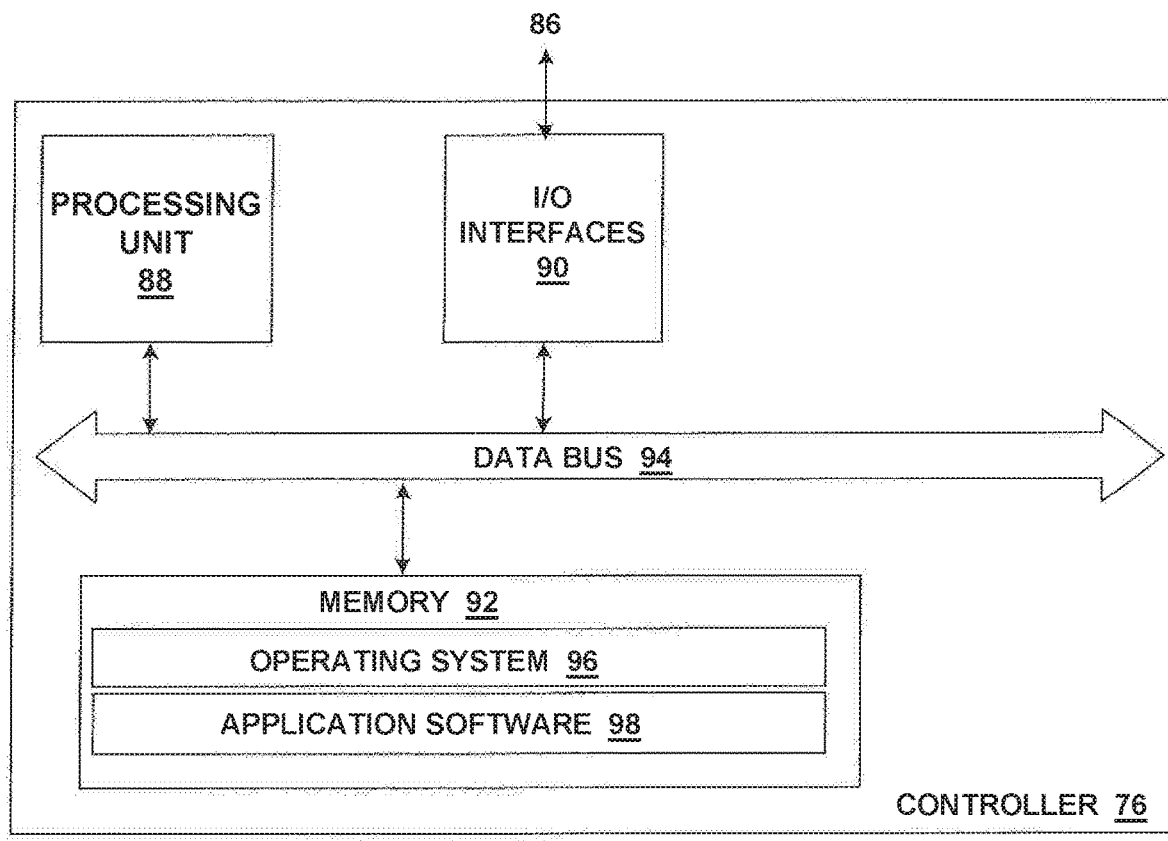
FIG. 5 is a block diagram of a controller of the control system of FIG. 4.

Referring to FIG. 5, shown is an embodiment of the example controller 76 depicted in FIG. 4, which comprises a computer architecture. It should be appreciated by one having ordinary skill in the art that the controller 76 depicted in FIG. 5 is one example illustration, and that in some embodiments, fewer, greater, and/or different components may be used. Also, it should be appreciated by one having ordinary skill in the art that certain well-known components of computer systems are omitted here to avoid obfuscating relevant features of the controller 76. In one embodiment, the controller 76 comprises one or more processing units 88, input/output (I/O) interface(s) 90, and memory 92, all coupled to one or more data busses, such as data bus 94. The memory 92 may include any one or a combination of volatile memory elements (e.g., random-access memory RAM, such as DRAM, SRAM, and SDRAM, etc.) and nonvolatile memory elements (e.g., ROM, Flash, solid state, EPROM, EEPROM, hard drive, CDROM, etc.). The memory 92 may store a native operating system, one or more native applications, emulation systems, or emulated applications for any of a variety of operating systems and/or emulated hardware platforms, emulated operating systems, etc. In the embodiment depicted in FIG. 6B, the memory 92 comprises an operating system 96 and application software 98. The application software 98 comprises executable code that receives optical sensor 42 input corresponding to type of grain, compares the type of grain with the grain specified for the specified bin 22, and issues commands to the distributor 34 to effect a movement of the control valve 38 for the respective spout 20. The application software 98, ensures that the type of grain is suitable for the selected bin Additional software may be used in some embodiments, including graphical user interface (GUI) software, browser software, communications software, etc. It should be appreciated that the application software 98 may be distributed among one or more software modules in the controller 76, or distributed in whole or in part in a remote computing device. In some embodiments, a separate storage device may be coupled to the data bus 94 or coupled via the I/O interfaces 90, such as a persistent memory (e.g., optical, magnetic, and/or semiconductor memory and associated drives).

Execution of the application software 98 is implemented by the processing unit 88 under the auspices of the operating system 96. In some embodiments, the operating system 96 may be omitted and a more rudimentary manner of control implemented. The processing unit 88 may be embodied as a custom-made or commercially available processor, a central processing unit (CPU) or an auxiliary processor among several processors, a semiconductor based microprocessor (in the form of a microchip), a macroprocessor, one or more application specific integrated circuits (ASICs), a plurality of suitably configured digital logic gates, and/or other well-known electrical configurations comprising discrete elements both individually and in various combinations to coordinate the overall operation of the controller 76. Note that the controller 76 may comprise additional functionality, including one or more of the functions provided by the control system 74.

When certain embodiments of the controller 76 are implemented at least in part in logic configured as software/firmware, as depicted in FIG. 5, it should be noted that the logic can be stored on a variety of non-transitory computer-readable medium for use by, or in connection with, a variety of computer-related systems or methods. In the context of this document, a computer-readable medium may comprise an electronic, magnetic, optical, or other physical device or apparatus that may contain or store a computer program for use by or in connection with a computer-related system or method. The logic may be embedded in a variety of computer-readable mediums for use by, or in connection with, an instruction execution system, apparatus, or device, such as a computer-based system, processor-containing system, or other system that can fetch the instructions from the instruction execution system, apparatus, or device and execute the instructions.

When certain embodiment of the controller 76 are implemented at least in part in logic configured as hardware, such functionality may be implemented with any or a combination of the following technologies, which are all well-known in the art: a discreet logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 6:
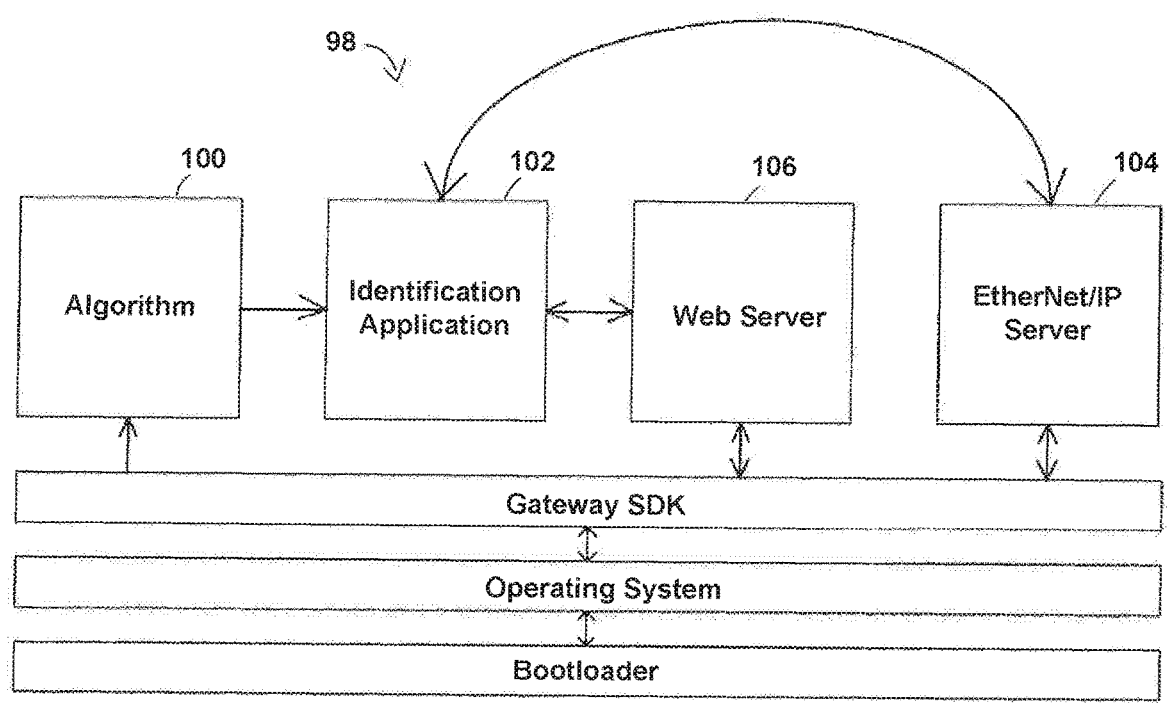
FIG. 6 is a block diagram of the optical sensing system software.

FIG. 6 is a block diagram that displays the application software 98 of the optical sensing system 40. The application software 98 is desirably split into two main components: an identification algorithm 100 and an identification application 102. The identification algorithm 100 is responsible for determining the grain type, and/or for determining the quality of the grain being passed along the grain transport line 14, and the identification application 102 resents a user interface such as EtherNet/IP 104 and Web interfaces 106. The identification algorithm 100 utilizes multiple types of machine learning algorithms to ensure the grain being monitored matches grain associated with the grain bin 22 it is being routed to. The optical sensing system 40 identifies grain types and may also identify if a grain mix or foreign matter (FM) is present. The software 98 desirably is updateable and allows for changes to be made to the algorithm as necessary. For instance, if an update becomes available that allows the optical sensing system 40 to detect insect parts, the update can be installed remotely and automatically into the optical sensing system 40 algorithm. The process for an update is as follows: the optical sensing system 40 checks during its startup if an update is available. If an update is available, the optical sensing system 40 then transitions into the programming state where the updated images and information are written into its application memory. The system is then automatically reset for normal use.

Notably, the software 98 of the optical sensing system 40 is capable of machine learning and is part of a convolutional neural network (CNN). As understood by those skilled in the art, CNNs are a class of deep, feed-forward artificial neural networks that are commonly implemented when analyzing visual imagery. CNNs are capable of sorting imagines into categories by comparing an image piece by piece. By finding rough feature matches in approximately the same position in two images, CNNs learn how to see similarities and differences between images. In the embodiment of the optical sensing system 40, the CNN was trained with many different commodities to induce hierarchical machine learning so that it is able to recognize as many commodities and FM as possible. This feature also allows the algorithm 100 to determine the confidence in the identification of grain or FM.

Figure 7:
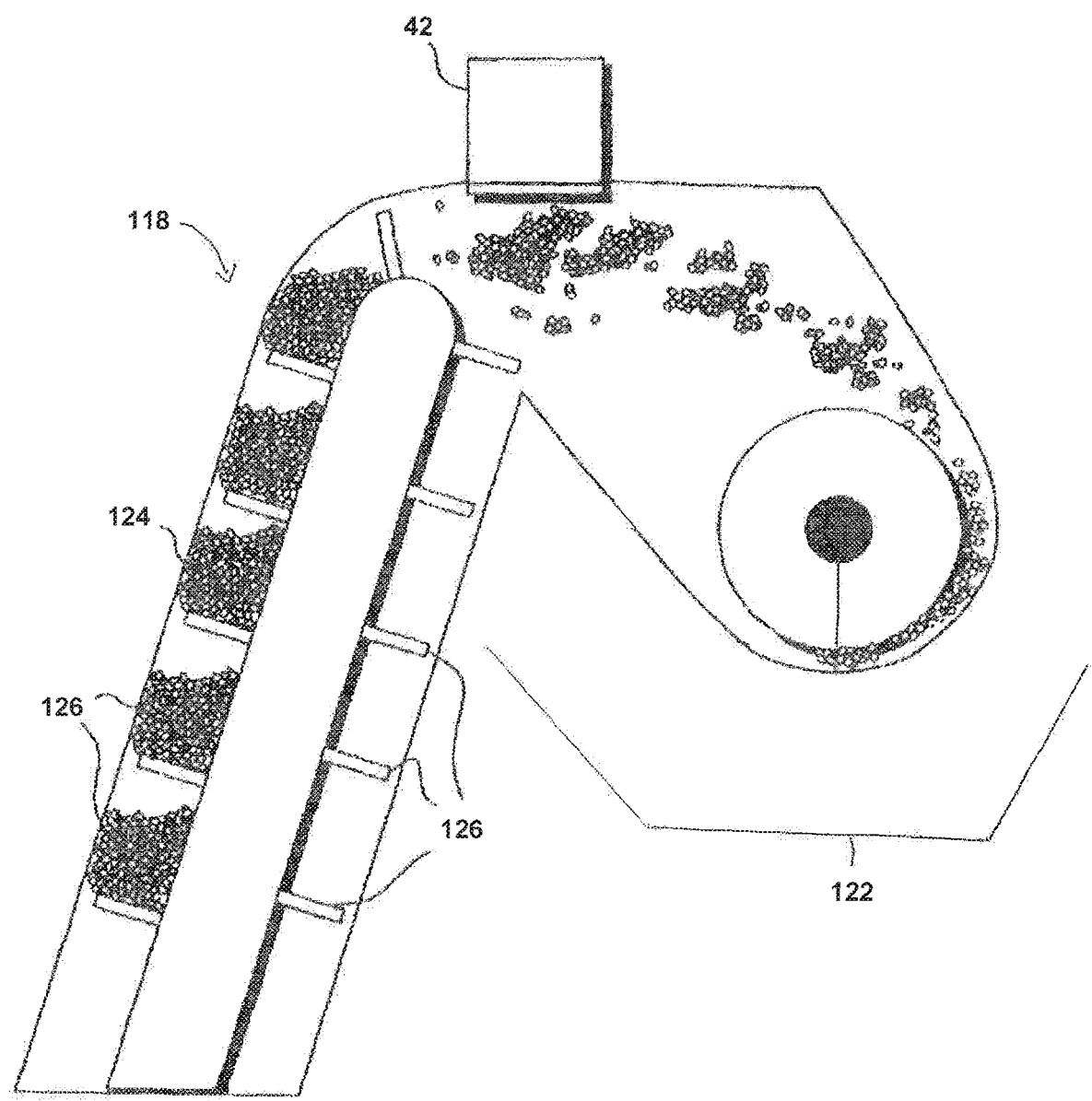
FIG. 7 is an alternate embodiment of an optical sensing system placed on a grain elevator of a combine.

FIG. 7 is directed to an alternate embodiment in which the grain transport line 14 is part of a grain elevator 118 of a combine harvester use to harvest grain in the field. The grain elevator 118 may be a paddle conveyor 124 in which loaded paddles 126 near a top point of the grain elevator 118 where grain is thrown into a grain bin 122 by centrifugal force as the paddles 126 switch directions and begin the descent back down the grain elevator 118. An optical sensor 42 is placed in the path of the grain that is ejected from the paddles 126. The optical sensing system 42 may be mounted so that it can examine the grain as it passes through the elevator 118 before it is dumped into the grain bin 122. In this embodiment, the optical sensing system 42 identifies the type of grain that is being passed through the combine elevator 118. Another function of this embodiment is the optical sensing system's ability to detect the average size of the grain being imaged. The combine operator is notified of the optical sensing system's readings and can, based on said readings, affect adjustments of the operating parameters of the subsystems of the combine for the purpose of optimizing the functionality of the combine and the effectiveness of the harvesting process. The optical sensing system's readings can also be fed into a control system of the combine harvester for the purpose of automatically optimizing the functionality of the combine and the effectiveness of the harvesting process.

The foregoing has broadly outlined some of the more pertinent aspects and features of the present invention. These should be construed to be merely illustrative of some of the more prominent features and applications of the invention. Other beneficial results can be obtained by applying the disclosed information in a different manner or by modifying the disclosed embodiments. Accordingly, other aspects and a more comprehensive understanding of the invention are obtained by referring to the detailed description of the exemplary embodiments taken in conjunction with the accompanying drawings.

The invention claimed is:

1. A grain storage and processing facility comprising:
a grain receiving station;
a grain transport line comprising:
  a grain elevator;
  a distributor with at least one input spout; and
  a plurality of grain bins, each bin having a designation specifying a different type of grain;
  wherein the grain transport line moves grain from the grain receiving station to one of the plurality of grain bins and the distributor directs the grain to a selected bin of the plurality of grain bins;
an optical sensing system having at least one optical sensor positioned in the grain transport line at or before the distributor, wherein the optical sensing system senses the type of grain in the grain transport line; and
a control system that determines if the grain passing through the grain transport line is the same type of grain as the type of grain specified by the designation of the selected grain bin and produces an alarm if the grain in the grain transport line is not the same type of grain as the type of grain specified by the designation of the selected grain bin.

2. The grain storage and processing facility of claim 1 wherein the grain elevator conveys the grain in a direction having a vertical component to change the elevation of the grain.

3. The grain storage and processing facility of claim 2 wherein the grain elevator comprises a bucket conveyor having a plurality of buckets.

4. The grain storage and processing facility of claim 1 wherein the optical sensing system is placed at the grain receiving station.

5. The grain storage and processing facility of claim 1 wherein the optical sensor has a transparent window that is operatively in contact with the grain to be identified in the grain transport line, wherein the transparent window is made of sapphire, aluminum oxynitride or magnesium aluminate.

6. The grain storage and processing facility of claim 5 wherein as the grain passes the transport window, the optical sensing system sends a signal to the control system.

7. The grain storage and processing facility of claim 1 wherein the control system stores the type of grain in each of the at least one grain bins and compares the type of grain detected in the grain transport line with the type of grain in the at least one grain bin that has been selected to receive the grain.

8. The grain storage and processing facility of claim 1 wherein the alarm is an audible alarm.

9. The grain storage and processing facility of claim 1 wherein the alarm is a visual alarm.

10. The grain storage and processing facility of claim 1 wherein the control system automatically stops the grain elevator if the grain in the grain transport line is not the same type of grain as the type of grain specified for the selected grain bin.

11. The grain storage and processing facility of claim 1 wherein the controller compares the type of grain sensed in the grain transport line with the type of grain specified for the selected grain bin.

* * * * *